US009766805B2

United States Patent
Bodagala

(10) Patent No.: US 9,766,805 B2
(45) Date of Patent: Sep. 19, 2017

(54) SYSTEM AND METHOD FOR TEXTUAL INPUT

(71) Applicant: SONY CORPORATION, Tokyo (JP)

(72) Inventor: Kishore Bodagala, Bangalore (IN)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 14/252,571

(22) Filed: Apr. 14, 2014

(65) Prior Publication Data

US 2015/0293693 A1    Oct. 15, 2015

(51) Int. Cl.
G06F 3/0488 (2013.01)
G06F 3/041 (2006.01)
G06F 3/01 (2006.01)
G06F 17/27 (2006.01)
G06F 3/023 (2006.01)

(52) U.S. Cl.
CPC .......... *G06F 3/04886* (2013.01); *G06F 3/018* (2013.01); *G06F 3/0236* (2013.01); *G06F 3/0237* (2013.01); *G06F 3/041* (2013.01); *G06F 17/276* (2013.01)

(58) Field of Classification Search
CPC ........ G06F 3/041; G06F 17/27; G06F 17/276; G06F 3/018; G06F 3/0236; G06F 3/0237; G06F 3/04886
USPC .................. 345/156, 173; 715/773
See application file for complete search history.

(56) References Cited

U.S. PATENT DOCUMENTS

| 6,047,298 A * | 4/2000 | Morishita ...................... 715/236 |
| 7,721,222 B1 * | 5/2010 | Shaik ............................. 715/773 |
| 8,253,694 B2 | 8/2012 | Raghunath et al. |
| 2013/0179822 A1 * | 7/2013 | Park ....................... G09G 5/225 715/774 |
| 2014/0237356 A1 * | 8/2014 | Durga ................... G06F 17/276 715/256 |
| 2015/0149952 A1 * | 5/2015 | Baheti ................... G06F 17/276 715/780 |

OTHER PUBLICATIONS

Anshuman Kumar et. al., "Saral: Devanagari Text input system in Mobile phones", (http://www.cs.swan.ac.uk/globicomp2009/papers/Paper-11-SARAL-revised%20paper.pdf), dated Aug. 27, 2009, pp. 1-4.

* cited by examiner

*Primary Examiner* — Dmitriy Bolotin
(74) *Attorney, Agent, or Firm* — Chip Law Group

(57) ABSTRACT

Various aspects of a system and method for textual input may include a server communicatively coupled to a client device. A base character may be determined in response to a user input. One or more conjunct characters that correspond to the base character may be displayed. The one or more conjunct characters may be displayed based on determining whether a frequency of occurrence of the one or more conjunct characters in a dictionary is above a predefined threshold.

20 Claims, 10 Drawing Sheets

SYSTEM AND METHOD FOR TEXTUAL INPUT

FIELD

Various embodiments of the disclosure relate to textual input. More specifically, various embodiments of the disclosure relate to a system and method for textual input in a device with a touch screen interface.

BACKGROUND

Languages with phonetic writing systems, such as Indian languages, Cambodian, Korean, Burmese, and the like, include a script that is written in a manner in which they are pronounced. The script of some of these languages uses a combination of consonant characters or consonant and vowel characters to form character units. Each of these character units is based on a consonant character with a vowel notation (also referred to as a diacritical mark) or a consonant character with a consonant notation (also referred to as a consonant conjunct). Existing devices with a touch screen interface provide support for input of text in such languages. For example, mobile devices with messaging functionality provide support for local languages so that users can communicate in their local languages.

Currently, a majority of these mobile devices are manufactured with small-sized touch screens. When entering consonants with diacritical marks or consonant conjuncts, the input process is iterative and time-consuming, requiring multiple back-and-forth navigations within the graphical user interface of such mobile devices.

Further limitations and disadvantages of conventional and traditional approaches will become apparent to one of skill in the art, through comparison of described systems with some aspects of the present disclosure, as set forth in the remainder of the present application, with reference to the drawings.

SUMMARY

A system and method are provided for textual input substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
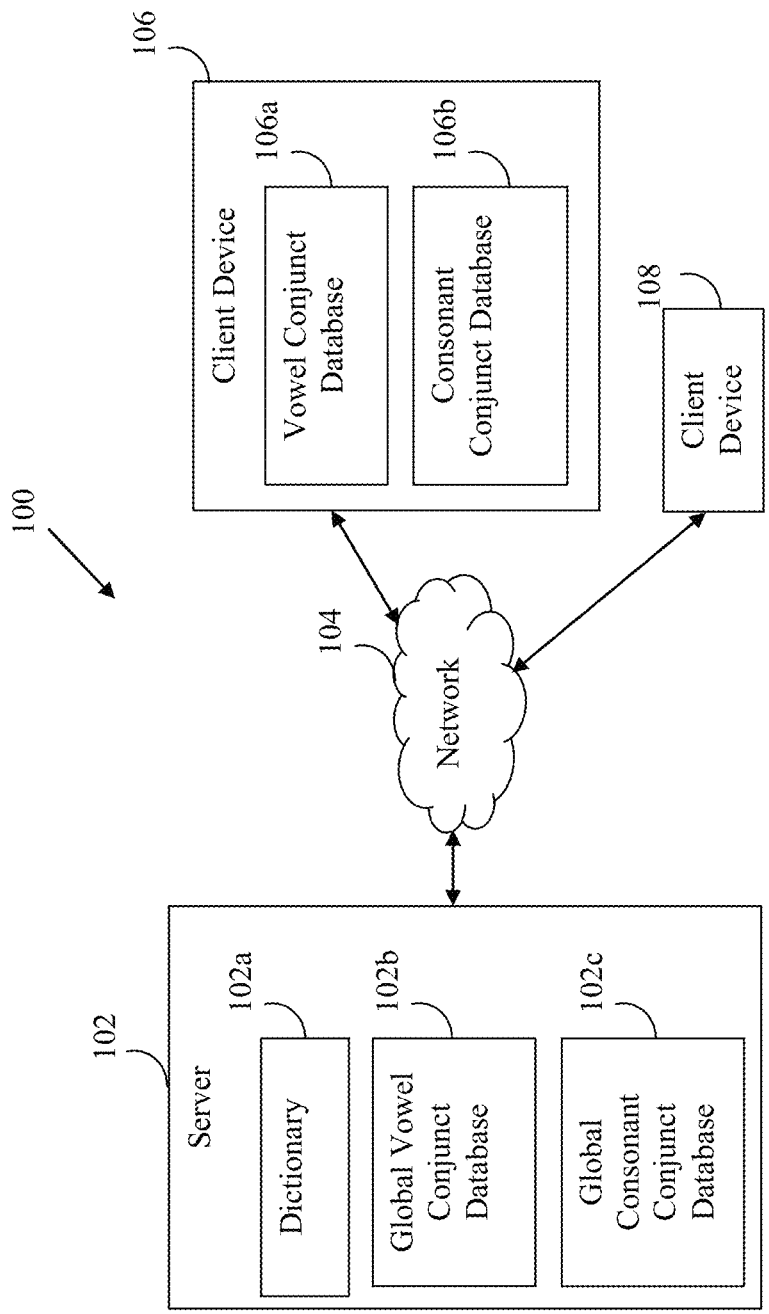
FIG. 1 is a block diagram illustrating a network environment, in accordance with an embodiment of the disclosure.

Various implementations may be found in a system and method for textual input. Exemplary aspects of a method for textual input may comprise a server having one or more processors. In an embodiment, the server may be operable to extract a plurality of base characters from a dictionary. The server may be further operable to assign a rank to each conjunct character among a plurality of conjunct characters, which correspond to each of the extracted base characters. The rank may be assigned based on a frequency of occurrence of each conjunct character in the dictionary. The server may be further operable to sort the conjunct characters based on the assigned rank.

In an embodiment, the server may be operable to assign a rank to each complex conjunct character among a plurality of complex conjunct characters. The rank may be assigned based on a frequency of occurrence of each complex conjunct character in the dictionary.

In an embodiment, each of the base characters may be represented by a single code point of a character encoding method. In an embodiment, each of the conjunct characters may be a combination of two code points of the character encoding method. In an embodiment, each of the complex conjunct characters may be a combination of at least three code points of the character encoding method.

Exemplary aspects of a method for textual input may comprise a client device having one or more processors and a touch screen interface. In an embodiment, the client device may be operable to determine a base character in response to a user input. The client device may be further operable to display one or more conjunct characters that correspond to the base character. The client device may display the one or more conjunct characters based on determining whether a frequency of occurrence of the one or more conjunct characters in a dictionary is above a predefined threshold.

In an embodiment, the client device may be operable to display the one or more conjunct characters in an order of priority based on the frequency of occurrence of the one or more conjunct characters in the dictionary.

In an embodiment, in response to a selection of one of the conjunct characters displayed, the client device may be operable to display one or more complex conjunct characters that correspond to the selected conjunct character. The client device may display the one or more complex conjunct characters based on a frequency of occurrence of the one or more complex conjunct characters in the dictionary.

In an embodiment, the client device may be operable to display the one or more conjunct characters that correspond to the base character based on usage frequency of the one or more conjunct characters.

In an example, the client device may be operable to display vowel characters in a first row and predefined consonant characters in a second row of a graphical keyboard. Notwithstanding, the disclosure may not be so limited, and the rows for displaying the vowel characters and the predefined consonant characters may be interchanged, or a single row may be used for displaying both the vowel characters and the predefined consonant characters, or additional rows may be utilized to display the vowel characters and/or the predefined consonant characters without limiting the scope of the disclosure. It is to be understood that the notations "first" and "second" are intended to refer to two different rows in the graphical keyboard, without limiting the display of the characters to a particular position on the graphical keyboard. In an embodiment, the client device may be operable to display vowel characters in a first column and predefined consonant characters in a second column of the graphical keyboard.

In response to a selection of one of the predefined consonant characters, the client device may be operable to display vowel conjunct characters that correspond to the selected consonant character. The client device may be further operable to display one or more consonant conjunct characters in a third row. Notwithstanding, the disclosure may not be so limited, and other rows may be utilized to display the consonant conjunct characters without limiting the scope of the disclosure. The one or more consonant conjunct characters may be displayed when the frequency of occurrence of the one or more consonant conjunct characters in the dictionary is above the predefined threshold.

In response to a selection of one of the consonant conjunct characters, the client device may be operable to display one or more complex conjunct characters that correspond to the selected consonant conjunct character in the first row. The one or more complex conjunct characters may be displayed based on their frequency of occurrence in the dictionary. In an embodiment, the client device may be operable to display the one or more complex conjunct characters in both the first row and the third row. Notwithstanding, the disclosure may not be so limited, and other rows may be utilized to display the complex conjunct characters without limiting the scope of the disclosure.

Exemplary aspects of a method for textual input may comprise a client device having one or more processors and a touch screen interface. In an embodiment, the client device may be operable to determine a base character in response to a user input. The client device may be further operable to display a subset of conjunct characters that correspond to the base character based on a rank assigned to each of the conjunct characters. In an embodiment, the client device may be operable to display the subset of conjunct characters in an order of priority based on the rank assigned to each of the conjunct characters.

In response to a selection of one of the subset of conjunct characters, the client device may be operable to display a subset of complex conjunct characters that correspond to the selected conjunct character based on a rank assigned to each of the complex conjunct characters.

FIG. 1 is a block diagram illustrating a network environment, in accordance with an embodiment of the disclosure. With reference to FIG. 1, there is shown a network environment 100. The network environment 100 may comprise a server 102, a communication network 104, and one or more client devices, such as client device 106 and client device 108.

The server 102 may comprise suitable logic, circuitry, interfaces, and/or code that may enable communication with the client device 106, either directly or via the communication network 104. In an embodiment, the server 102 may be implemented as part of a server cloud. The server 102 may be accessed and managed by one or more administrators to upload and manage an electronic dictionary 102a for each language. The server 102 may generate and manage one or more databases for sorting characters in the dictionary 102a and storing the characters based on the sorting. For example, for each language, the one or more databases may include a global vowel conjunct database 102b, and a global consonant conjunct database 102c. The server 102 may be operable to transmit copies of these databases 102b and 102c, to client devices 106 and 108, as part of a client application package. In an embodiment, an administrator may interact with the server 102 directly. In other embodiments, the administrator user may issue commands or instructions indirectly to the server 102 via the communication network 104.

The communication network 104 may include a medium through which the server 102 may communicate with the client device 106, and the client device 108 in the network environment 100. Examples of the communication network 104 may include, but are not limited to, the Internet, a Wireless Fidelity (WiFi) network, a Wireless Local Area Network (WLAN), a Local Area Network (LAN), a telephone line (POTS), or a Metropolitan Area Network (MAN). Various devices in the network environment 100 may be operable to connect to the communication network 104, in accordance with various wired and wireless communication protocols, such as, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The client device 106 may be one or more of a mobile device, a cellular phone, a tablet, a laptop computer, a personal computer, and consumer devices or appliances, such as a network-enabled smart television. The client device 106 may include other computing devices capable of displaying a graphical keyboard, receiving input via a touch screen, performing messaging functionality, such as short message service (SMS) messaging and electronic-mail (e-mail), and executing a text processing application. The client device 106 may comprise suitable logic, circuitry, interfaces, and/or code that may enable communication with the server 102, and/or the client device 108. The interfaces of the client device 106 may comprise one or more network interfaces that may enable communication with the server 102.

In operation, the server 102 may be operable to extract a plurality of base characters from the dictionary 102a. The server 102 may be further operable to assign a rank to each conjunct character among a plurality of conjunct characters that corresponds to each of the extracted base characters. The rank may be assigned based on a frequency of occurrence of the conjunct character in the dictionary 102a. The server 102 may be further operable to sort the conjunct characters based on the assigned rank.

In an embodiment, the server 102 may be operable to assign a rank to each complex conjunct character that corresponds to each of the conjunct characters. The rank may be assigned based on a frequency of occurrence of each complex conjunct character in the dictionary 102a.

In an embodiment, each of the base characters may be represented by a single code point of a character encoding method. In an embodiment, each of the conjunct characters may be a combination of two code points of the character encoding method. In an embodiment, each of the complex conjunct characters may be a combination of at least three code points of the character encoding method. In an example, the code point may be a unique number assigned to each character in the alphabet. Examples of character encoding methods may include, but are not limited to, Unicode, American standard code for information interchange (ASCII), Indian standard code for information interchange (ISCII), and the like.

In an embodiment, for each language, the client device 106 may be operable to receive or download a copy of the global vowel conjunct database 102b, and the global consonant conjunct database 102c. The client device 106 may be operable to receive copies of these databases 102b and 102c from the server 102, as part of a client application package. The client device 106 may be further operable to install the client application package to establish a client-server relationship with the server 102. The client device 106 may store the downloaded copies as a vowel conjunct database 106a and a consonant conjunct database 106b in a memory. After installation, the client application may be launched every time an application that requires input via a graphical keyboard is launched.

In an embodiment, the client device 106 may be operable to determine a base character in response to a user input. The client device 106 may be further operable to display one or more conjunct characters that correspond to the base character. The client device 106 may display the one or more conjunct characters based on determining whether a frequency of occurrence of the one or more conjunct characters in the dictionary 102a, is above a predefined threshold.

In an embodiment, in response to a selection of one of the conjunct characters displayed, the client device 106 may be operable to display one or more complex conjunct characters that correspond to the selected conjunct character. The client device 106 may display the one or more complex conjunct characters based on their frequency of occurrence in the dictionary 102a. In an embodiment, the client device 106 may be operable to display the one or more complex conjunct characters in an order of priority based on the frequency of occurrence of the one or more complex conjunct characters in the dictionary 102a.

In an embodiment of the present disclosure, the client device 106 may be operable to determine a base character in response to a user input. The client device 106 may be further operable to display a subset of conjunct characters that correspond to the base character, based on a rank assigned to each of the conjunct characters. In an embodiment, the client device 106 may be operable to display the subset of conjunct characters in an order of priority based on the rank assigned to each of the conjunct characters.

In an embodiment, the client device 106 may be operable to store a local copy of the dictionary and generate the vowel conjunct database 106a, and the consonant conjunct database 106b, based on the locally stored dictionary. The client device 106 may be operable to sort the vowel conjunct characters and the consonant conjunct characters in the vowel conjunct database 106a, and the consonant conjunct database 106b, respectively. The vowel conjunct characters and the consonant conjunct characters may be sorted based on the frequency of occurrence of these characters in the locally stored dictionary.

Figure 2:
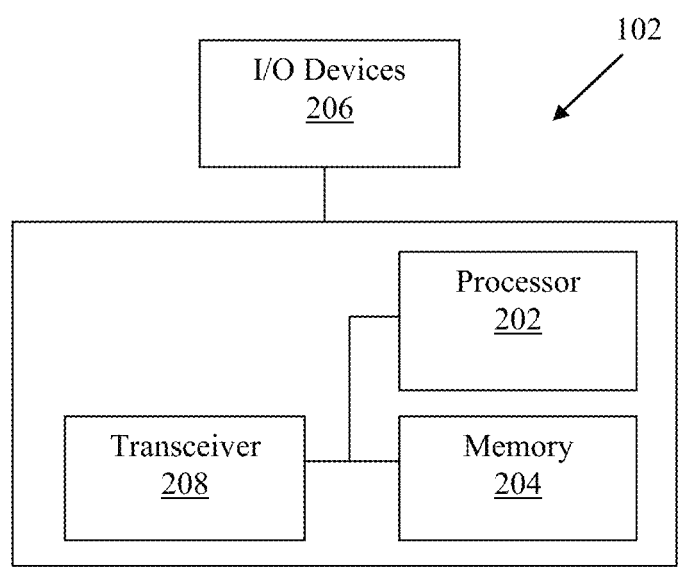
FIG. 2 is a block diagram illustrating a computing device for textual input, in accordance with an embodiment of the disclosure.

FIG. 2 is a block diagram illustrating a computing device for textual input, in accordance with an embodiment of the disclosure. FIG. 2 is explained in conjunction with elements from FIG. 1. With reference to FIG. 2, there is shown a server 102, which comprises a processor 202, a memory 204, Input-Output (I/O) devices 206, and a transceiver 208.

The processor 202 may be communicatively coupled to the memory 204, and the I/O devices 206. Further, the transceiver 208 may be communicatively coupled to the processor 202, the memory 204, and the I/O devices 206.

The processor 202 may comprise suitable logic, circuitry, interfaces, and/or code that may be operable to execute a set of instructions stored in the memory 204. The processor 202 may be implemented based on a number of processor technologies known in the art. Examples of processor 202 may be an X86-based processor, a RISC processor, an ASIC processor, a CISC processor, or any other processor.

The memory 204 may comprise suitable logic, circuitry, interfaces, and/or code that may be operable to store the received set of instructions. The memory 204 may be implemented based on, but not limited to, a Random Access Memory (RAM), a Read-Only Memory (ROM), a Hard Disk Drive (HDD), a storage server and/or a secure digital (SD) card. The memory 204 may be operable to store the electronic dictionary 102a or a database of words in different languages. The words in the dictionary 102a may be sorted in a particular order. For example, the words in the dictionary 102a may be sorted based on their meanings or associated attributes, such as, pronunciation, spelling, etc. The memory 204 may be further operable to store the global vowel conjunct database 102b and the global consonant conjunct database 102c for one or more languages. The global vowel conjunct database 102b may comprise a list of vowel conjuncts sorted in accordance with embodiments of the present disclosure. The global consonant conjunct database 102c may comprise a list of consonant conjuncts sorted in accordance with embodiments of the present disclosure.

The I/O devices 206 may comprise various input and output devices operably connected to the processor 202. Examples of input devices include, but are not limited to, a keyboard, a mouse, a joystick, a touch screen, a microphone, a camera, a motion sensor, a light sensor, and/or a docking station. Examples of output devices include, but are not limited to, a display, and/or a speaker.

The transceiver 208 may comprise suitable logic, circuitry, interfaces, and/or code that may be operable to communicate with the client device 106, and the client device 108, via different communication interfaces. The transceiver 208 may implement known technologies to support wired or wireless communication with the communication network 104.

In operation, the processor 202 may be operable to extract a plurality of base characters from a dictionary 102a. The processor 202 may be further operable to assign a rank to each conjunct character among a plurality of conjunct characters that correspond to each of the extracted base characters. The rank may be assigned based on a frequency of occurrence of each conjunct character in the dictionary 102a. The processor 202 may be further operable to sort the conjunct characters based on the assigned rank.

In an embodiment, the processor 202 may be operable to store the plurality of conjunct characters in the global vowel conjunct database 102b and the global consonant conjunct database 102c. In an embodiment, the processor 202 may be operable to assign a rank to each vowel conjunct character that corresponds to each of the extracted base characters. The processor 202 may sort the vowel conjunct characters based on the assigned rank and store the sorted vowel conjunct characters in the global vowel conjunct database 102b.

In an embodiment, the processor 202 may be operable to assign a rank to each consonant conjunct character that corresponds to each of the extracted base characters. The processor 202 may sort the consonant conjunct characters based on the assigned rank and store the sorted consonant conjunct characters in the global consonant conjunct database 102c.

In an embodiment, the processor 202 may be operable to assign a rank to each complex conjunct character among a plurality of complex conjunct characters that correspond to each of the conjunct characters. The rank may be assigned based on a frequency of occurrence of each complex conjunct character in the dictionary 102a.

Figure 3:
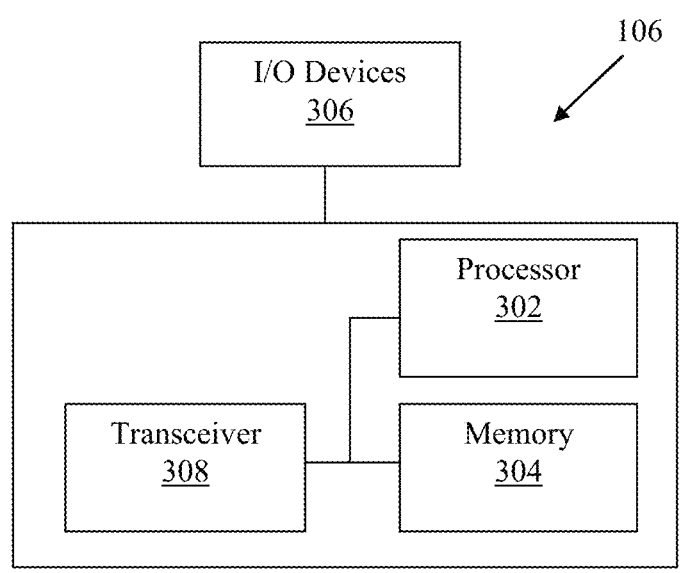
FIG. 3 is a block diagram illustrating a computing device for textual input, in accordance with an embodiment of the disclosure.

FIG. 3 is a block diagram illustrating a computing device for textual input, in accordance with an embodiment of the disclosure. FIG. 3 is explained in conjunction with elements from FIG. 1. With reference to FIG. 3, there is shown the client device 106. The client device 106 may comprise a processor 302, a memory 304, Input-Output (I/O) devices 306, and a transceiver 308.

The processor 302 may be communicatively coupled to the memory 304, and the I/O devices 306. Further, the transceiver 308 may be communicatively coupled to the processor 302, the memory 304, and the I/O devices 306. The processor 302, the memory 304, the I/O devices 306, and the transceiver 308 may be similar in functionality and examples to the processor 202, the memory 204, the I/O devices 206, and the transceiver 208 described with reference to FIG. 2.

The memory 304 may be operable to store the vowel conjunct database 106a and the consonant conjunct database 106b for one or more languages. The vowel conjunct database 106a may comprise a list of vowel conjuncts sorted in accordance with the embodiment of the present disclosure. The consonant conjunct database 106b may comprise a list of consonant conjuncts sorted in accordance with the embodiment of the present disclosure.

In an embodiment, the processor 302 may be operable to download a copy of the global vowel conjunct database 102b and the global consonant conjunct database 102c. The memory 304 may be operable to store the downloaded copies as the vowel conjunct database 106a and the consonant conjunct database 106b. In an embodiment, the memory 304 may be operable to store a local copy of the dictionary 102a. The processor 302 may be operable to generate the vowel conjunct database 106a, and the consonant conjunct database 106b, based on the locally stored dictionary.

The transceiver 308 may comprise suitable logic, circuitry, interfaces, and/or code that may be operable to communicate via various communication interfaces with the server 102, and other client devices 108. The transceiver 308 may implement known technologies to support wired or wireless communication with the communication network 114.

In operation, the processor 302 may be operable to determine a base character in response to a user input. The processor 302 may be further operable to display one or more conjunct characters that correspond to the base character. The processor 302 may display the one or more conjunct characters based on the determination that a frequency of occurrence of the one or more conjunct characters in the dictionary 102a, is above a predefined threshold.

In an embodiment, the processor 302 may be operable to display the one or more conjunct characters in an order of priority based on their frequency of occurrence in the dictionary 102a. In an embodiment, the one or more conjunct characters may be displayed in a left-to-right order on the graphical keyboard based on the order of priority. For example, the most frequently occurring conjunct character in the dictionary 102a, which corresponds to the selected base character, may be displayed at the left-most position on the graphical keyboard. In an embodiment, the one or more conjunct characters may be displayed in a top-to-bottom order on the graphical keyboard based on the order of priority.

In an embodiment, in response to a selection of one of the conjunct characters displayed, the processor 302 may be operable to display one or more complex conjunct characters that correspond to the selected conjunct character. The processor 302 may display the one or more complex conjunct characters based on a frequency of occurrence of the one or more complex conjunct characters in the dictionary 102a.

In an embodiment, the processor 302 may be operable to display the one or more conjunct characters that correspond to the base character, based on usage frequency of the one or more conjunct characters. For example, the processor 302 may be operable to learn that a particular conjunct character has been frequently used by a user, and display the conjunct character in a predefined row of the graphical keyboard. In an embodiment, the sorted list of conjunct characters in the vowel conjunct database 106a, and the consonant conjunct database 106b, may be updated or modified based on usage frequency of the one or more conjunct characters. In an embodiment, the sorted list of conjunct characters in the vowel conjunct database 106a and the consonant conjunct database 106b may be updated to include frequently used characters in another language. For example, a syllable of a term in another language entered in a local language may be captured as a frequently used character, and added to the databases 106a or 106b.

In an embodiment, the processor 302 may be operable to display vowel characters in a first row and predefined consonant characters in a second row of a graphical keyboard. In response to a selection of one of the predefined consonant characters, the processor 302 may be operable to display vowel conjunct characters that correspond to the selected consonant character in the first row. The processor 302 may be further operable to display one or more consonant conjunct characters in a third row. The one or more consonant conjunct characters may be displayed when their frequency of occurrence in the dictionary 102a is above the predefined threshold.

In response to a selection of one of the consonant conjunct characters, the processor 302 may be operable to display one or more complex conjunct characters, which correspond to the selected consonant conjunct character in the first row. The one or more complex conjunct characters may be displayed based on their frequency of occurrence in the dictionary 102a. In an embodiment, the processor 302 may be operable to display the one or more complex conjunct characters in both the first row and the third row of the graphical keyboard.

In an embodiment, the predefined threshold may be set or defined by the administrator of the server 102. In another embodiment, the predefined threshold may be set or defined by a user of the client device 106. In another embodiment, the server 102 and/or the client device 106 may set the predefined threshold based on relative count of occurrences of conjunct characters in the dictionary 102a. For example, a first conjunct character may occur M times in the dictionary 102a, and a second conjunct character may occur N times in the dictionary 102a, which is less than M. In this case, the server 102 and/or the client device may set the predefined threshold based on the difference between M and N and the difference between M and count of occurrence of other conjunct characters.

Figure 4:
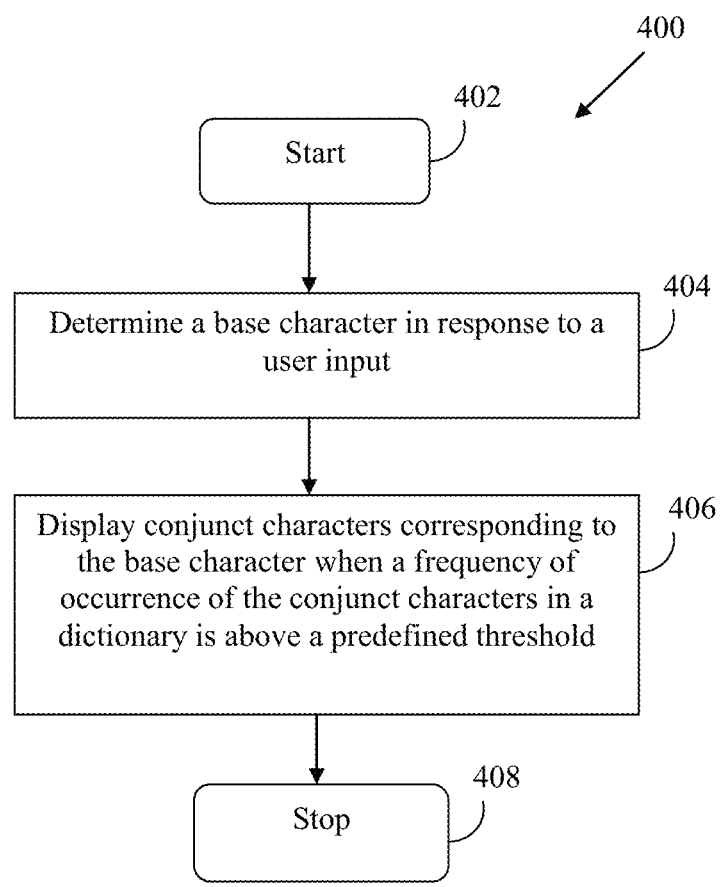
FIG. 4 is a flowchart illustrating exemplary steps for textual input, in accordance with an embodiment of the disclosure.

FIG. 4 is a flowchart 400 illustrating exemplary steps for textual input, in accordance with an embodiment of the disclosure. FIG. 4 will be described in conjunction with elements of FIG. 1. The method 400 may be implemented in the client device 106 communicatively coupled to the server 102.

The method 400 begins at step 402 and proceeds to step 404. At step 404, a base character may be determined in response to a user input. The base characters may be displayed in a predefined row of the graphical keyboard. The client device 106 may receive the user input via a touch screen or a microphone. The user input may be a selection of one of the base characters via the touch screen, or a speech input enunciating a base character via the microphone.

At step 406, one or more conjunct characters that correspond to the base character may be displayed. The one or more conjunct characters may be displayed based on determining whether a frequency of occurrence of the one or more conjunct characters in the dictionary 102a is above a predefined threshold. At step 408, the method 400 ends.

Figure 5:
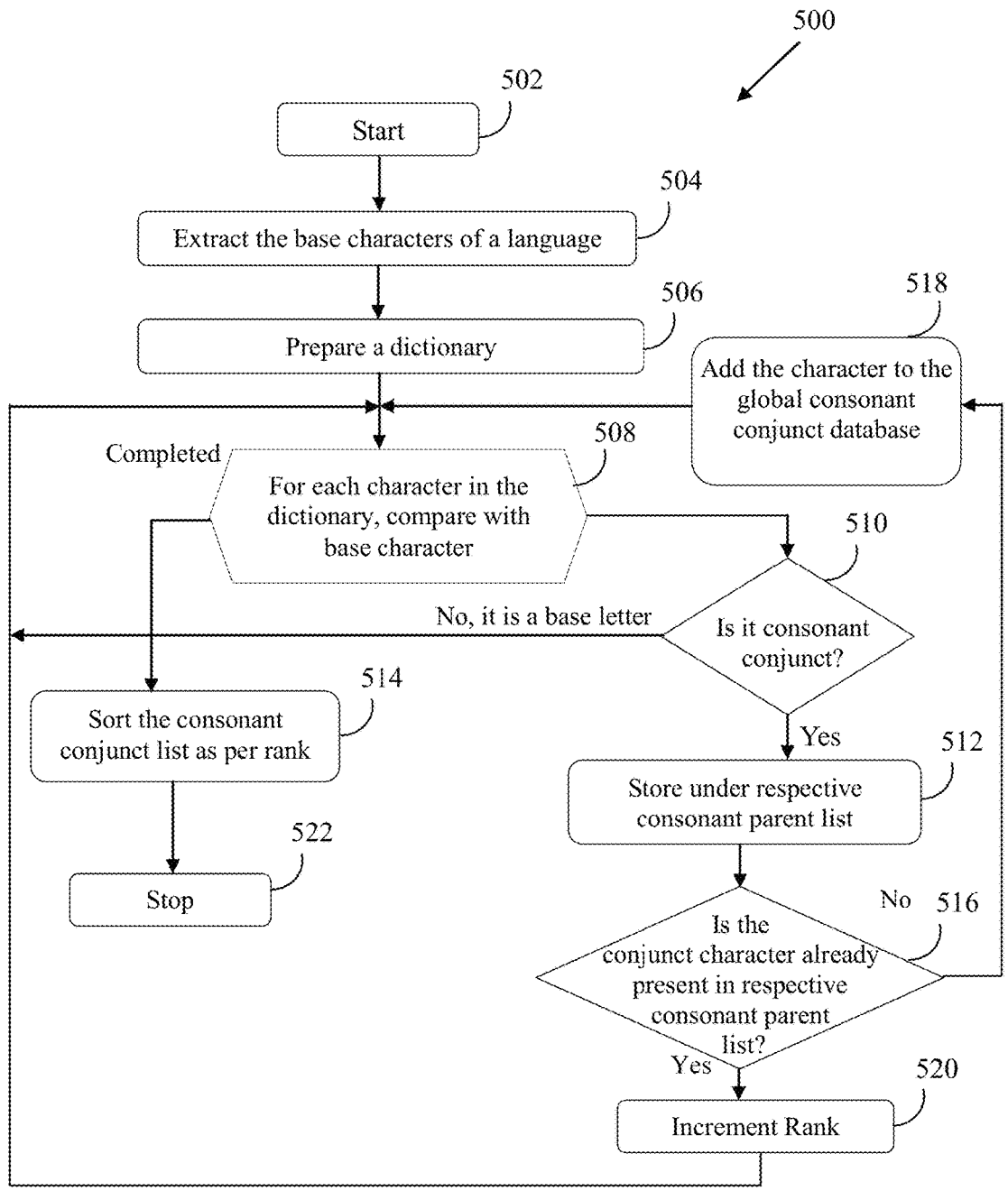
FIG. 5 is a flowchart illustrating exemplary steps for generating a consonant conjunct character database, in accordance with an embodiment of the disclosure.

FIG. 5 is a flowchart illustrating exemplary steps for generating a consonant conjunct character database, in accordance with an embodiment of the disclosure. FIG. 5 will be described in conjunction with elements of FIG. 1. The method 500 may be implemented in a network comprising the server 102 communicatively coupled to client device 106.

The method 500 begins at step 502 and then proceeds to step 504. At step 504, the server 102 may extract base characters of a language of interest. Each extracted base character of a language may represent a single code point of a character encoding method for that language.

At step 506, the server 102 may compile a dictionary 102a for the language. The server 102 may compile the dictionary 102a from one or more online dictionaries available for the language. The server 102 may also compile the dictionary 102a based on an online lexicon available for the language. In an embodiment, the server 102 may compile the dictionary 102a, by parsing the World Wide Web (www) for publications in the language of interest.

At step 508, the server 102 may compare each character in the dictionary 102a with the extracted base characters. At step 510, the server 102 may determine whether the character is a consonant conjunct character. In instances where the character is a consonant conjunct character, control passes to step 512.

At step 512, the consonant conjunct character may be stored under a respective consonant parent list. In an embodiment, the consonant conjunct character may correspond to more than one consonant. For example, the consonant conjunct character "kya" may be stored under consonant parent lists for both "ka" and "ya".

At step 516, the server 102 may determine whether the consonant conjunct character is present in the respective consonant parent list. In instances where the consonant conjunct character is not present in the global consonant conjunct database 102c, control passes to step 518. At step 518, the server 102 may add the newly encountered consonant conjunct character to the global consonant conjunct database 102c, and assign a lowest rank to the consonant conjunct character. Control then returns to step 508. In instances where the consonant conjunct character is present in the global consonant conjunct database 102c, control passes to step 520.

At step 520, the rank assigned to the consonant conjunct character may be incremented in steps. Control then returns to step 508, and the method 500 continues until all the characters in the dictionary 102a have been processed. Control then passes to step 514.

At step 514, the server 102 may sort the consonant conjunct characters in the global consonant conjunct database 102c, based on rank assigned to each of the consonant conjunct characters. Control passes to end step 522.

Figure 6:
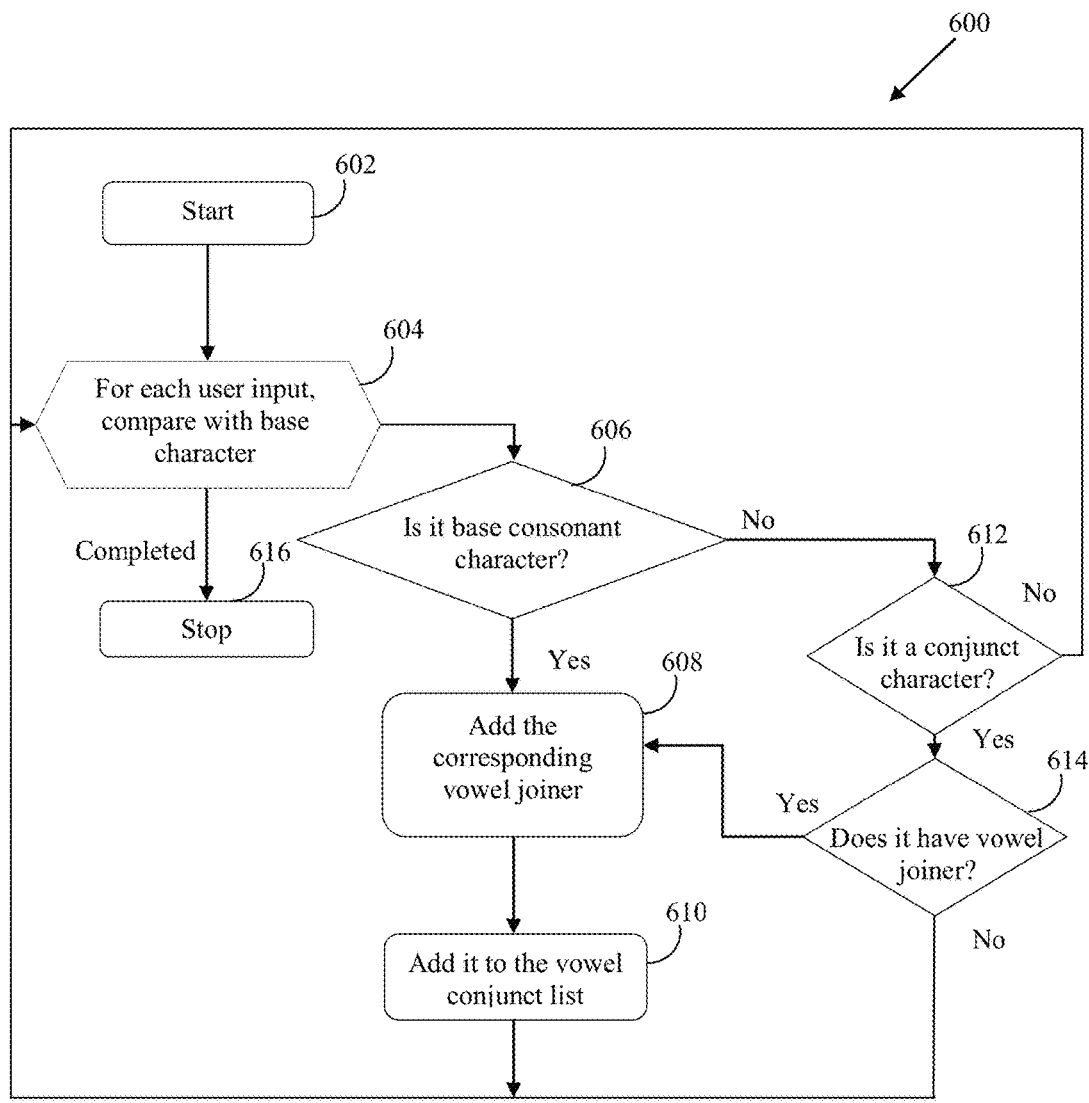
FIG. 6 is a flowchart illustrating exemplary steps for generating a vowel conjunct character database, in accordance with another embodiment of the disclosure.

FIG. 6 is a flowchart illustrating exemplary steps for generating a vowel conjunct character database, in accordance with another embodiment of the disclosure. FIG. 6 will be described in conjunction with elements of FIG. 1. The method 600 may be implemented in a network comprising the client device 106 communicatively coupled to server 102.

The method 600 begins at step 602 and proceeds to step 604. At step 604, for each user input, the client device 106 may compare the user input with the base characters. Control passes to step 606.

At step 606, the client device 106 determines whether the user input corresponds to a base consonant character. When it is determined that the user input corresponds to a base consonant character, control passes to step 608. When it is determined that the user input does not correspond to a base consonant character, control passes to step 612.

At step 608, the corresponding vowel joiner may be added to the base consonant character based on subsequent user input. At step 610, the vowel conjunct character entered at step 608 may be added to the vowel conjunct database 106a. Control then returns to 604.

At step 612, the client device 106 determines whether the user input is a conjunct character. In instances where the user input does not correspond to a conjunct character, control returns to step 604. When it is determined that the user input corresponds to a conjunct character, control passes to step 614.

At step 614, the client device 106 determines whether the conjunct character has a vowel joiner based on user input. In instances where the conjunct character does not have a vowel joiner, control returns to step 604. In instances where the conjunct character has a vowel joiner, control passes to step 608.

At step 608, the corresponding vowel joiner may be added to the conjunct character. Control then passes to step 610.

At step 610, the vowel conjunct character entered at step 608 may be added to the vowel conjunct database 106a. Control then returns to 604.

After all the user input is processed, control passes to end step 616.

Figure 7:
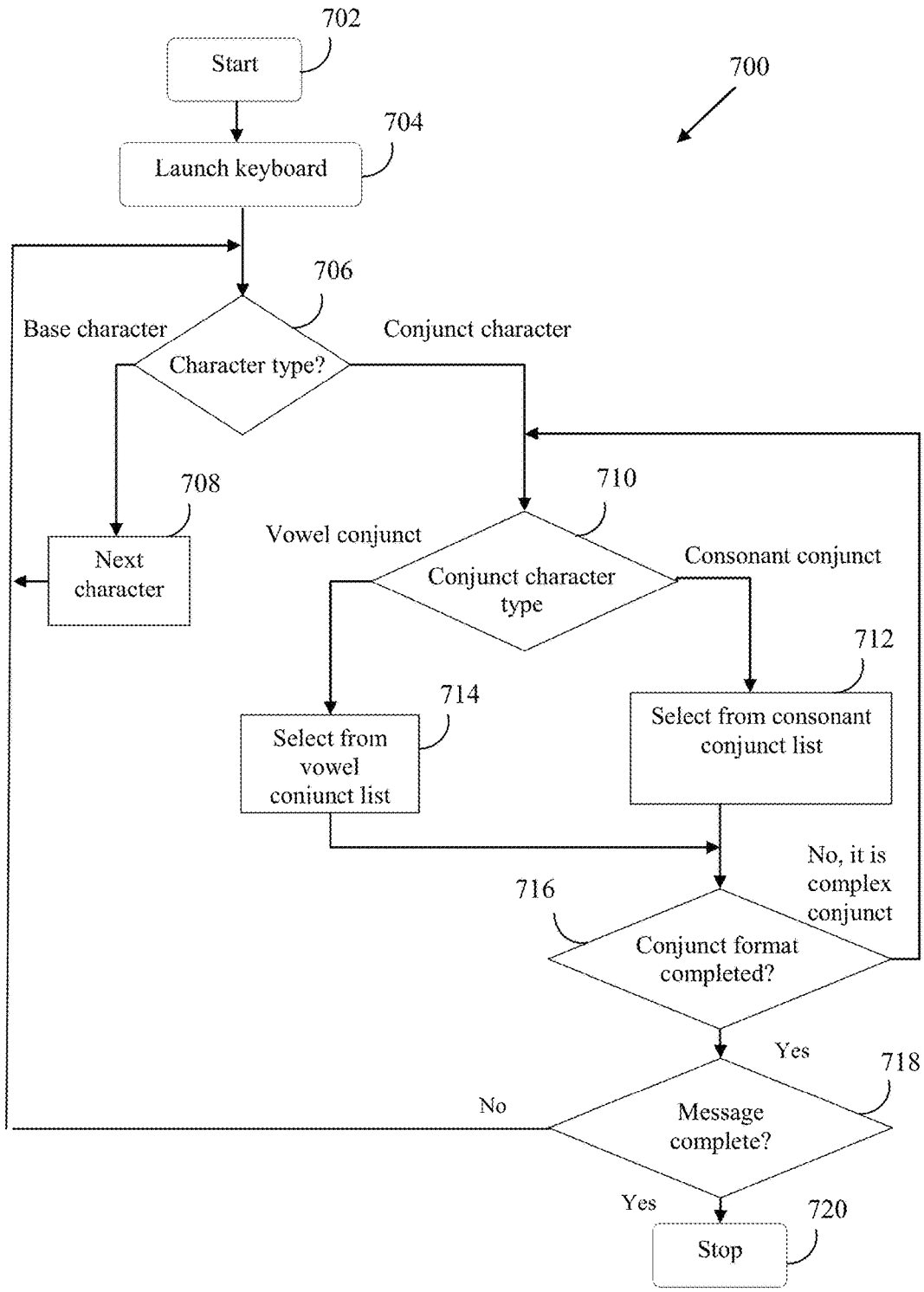
FIG. 7 is a flowchart illustrating exemplary steps for textual input, in accordance with another embodiment of the disclosure.

FIG. 7 is a flowchart illustrating exemplary steps for textual input, in accordance with another embodiment of the disclosure. FIG. 7 will be described in conjunction with elements of FIG. 1. The method 700 may be implemented in a network comprising the client device 106 communicatively coupled to server 102.

The method 700 begins at step 702 and proceeds to step 704. At step 704, the client device 106 launches the graphical keyboard. The keyboard may be launched based on user input to compose or edit an SMS message or an e-mail, for example. Control then passes to step 706.

At step 706, the client device 106 determines whether the type of character that corresponds to the user input is a base character or a conjunct character. In instances where the user input is a base character, control passes to step 708. At step 708, user input of a next character may be received. In instances where the user input is a conjunct character, control passes to step 710.

At step 710, the client device 106 determines whether the type of the conjunct character that corresponds to the user input is a vowel conjunct character or a consonant conjunct character. In instances where the conjunct character is a consonant conjunct character, control passes to step 712.

At step 712, one or more consonant conjunct characters may be selected from the consonant conjunct database 106b, and displayed. The selection of the one or more consonant conjunct characters for display may be based on the frequency of occurrence or the rank assigned to the sorted consonant conjunct characters in the consonant conjunct database 106b. Control then passes to step 716. With reference to previous step 710, in instances where the conjunct character is a vowel conjunct character, control passes to step 714.

At step 714, one or more vowel conjunct characters are selected from the consonant conjunct database 106b, and displayed. The selection of the one or more vowel conjunct characters for display may be based on the frequency of occurrence or the rank assigned to the sorted vowel conjunct characters in the vowel conjunct database 106a. Control then passes to step 716.

At step 716, the client device 106 determines whether the conjunct format is complete based on subsequent user input. In instances where the conjunct format is not complete, control passes to step 710. Following step 710, complex conjunct characters are selected and displayed. In instances where the conjunct format is complete, control passes to step 718.

At step 718, the client device 106 determines whether the message is complete. In instances where the message is not complete, control returns to step 706. In instances where the message is complete, control passes to end step 720.

FIGS. 8A, 8B, 8C, 8D, 8E, and 8F are screenshots illustrating a graphical user interface (GUI) for textual input, in accordance with an embodiment of the disclosure. FIGS. 8A-8F will be described in conjunction with elements of FIG. 1.

Figure 8A:
FIGS. 8A, 8B, 8C, 8D, 8E, and 8F are screenshots illustrating a graphical user interface (GUI) for textual input, in accordance with an embodiment of the disclosure.

With reference to FIGS. 8A-8F, an example for textual input of the Hindi term नमस्ते (Namaste) is described, in accordance with embodiments of the present disclosure. As shown in FIG. 8A, all the vowel characters of the Hindi alphabet are displayed on the first row of the graphical keyboard and predefined consonant characters are displayed on the second row. In an embodiment, the keys which correspond to predefined consonant characters in the second row may be clubbed with other consonants, based on pronunciation of these characters. For example, the key which corresponds to the consonant "Ka" may be combined with the consonant "Kha" which are related in pronunciation but vary in emphasis. In an embodiment, the second row of consonant characters may be scrollable to display other consonant characters which are not shown when the graphical keyboard is launched. In an embodiment, the third row of the graphical keyboard may display special characters, or numerals, in a local language and/or English.

Figure 8B:

As shown in FIG. 8B, when the consonant character "न" (Na) is selected, the corresponding consonant character may be displayed in the typing area. The layout of the graphical keyboard may be changed to replace the vowel characters displayed in the first row with all the vowel conjunct characters that correspond to the consonant character "Na". At about the same time, a subset of consonant conjunct characters which correspond to the consonant character "Na", may be displayed in the third row in an order of priority. The consonant conjunct characters which are displayed and the order of their priority may be determined based on the rank assigned to each of the consonant conjunct characters in the consonant conjunct database 106b. The consonant conjunct characters may also be sorted in a decreasing order of the rank assigned to each of the consonant conjunct characters in the consonant conjunct database 106b. In an embodiment, the higher the frequency of occurrence of the consonant conjunct character in the dictionary 102a, the higher is the rank and the order of priority assigned to the consonant conjunct character.

The consonant conjunct characters that correspond to the consonant character "Na", may be displayed based on a search through the sorted consonant conjunct characters in the consonant conjunct database 106b. This reduces the time required to search for a limited number of consonant conjunct characters which have a frequency of occurrence in the dictionary 102a, above a predefined threshold. In an embodiment, the number of consonant conjunct characters that are displayed may also be limited to those consonant conjunct characters that have a frequency of occurrence in the dictionary 102a above the predefined threshold. In an embodiment, the third row of consonant conjunct characters may be scrollable to display additional consonant conjunct characters that have a lower frequency of occurrence, or a lower order of priority than those displayed in FIG. 8B.

Figure 8C:

As shown in FIG. 8C, the consonant character "म" (Ma) is selected and the corresponding consonant character may be displayed in the typing area. The layout of the graphical keyboard may be changed to display all the vowel conjunct characters that correspond to the consonant character "Ma" in the first row. At about the same time, a subset of consonant conjunct characters that correspond to the consonant character "Ma", may be displayed in the third row in an order of priority. In an embodiment, the second row of consonant characters may remain unchanged. In an embodiment, the second row of consonant characters may be automatically scrolled when the selected consonant character is at the end of the second row.

Figure 8D:

As shown in FIG. 8D, the consonant character "स" (Sa) is selected and the corresponding consonant character may be displayed in the typing area. The layout of the graphical keyboard may be changed to display all the vowel conjunct characters that correspond to the consonant character "Sa", in the first row. At about the same time, a subset of consonant conjunct characters that corresponds to the consonant character "Sa", may be displayed in the third row in an order of priority.

Figure 8E:
Figure 8F:

As shown in FIG. 8E, when the consonant conjunct character "स्त" (Sta) is selected, the layout of the graphical keyboard may change to FIG. 8F. In FIG. 8F, all or a subset of complex conjunct characters that corresponds to the consonant conjunct character "Sta" may be displayed in the first and third rows of the graphical keyboard. In an embodiment, the complex conjunct characters that end with a vowel notation may be displayed in one row of the graphical keyboard. In an embodiment, the complex conjunct characters that end with a consonant notation may be displayed in another row of the graphical keyboard. In an embodiment, the complex conjunct characters, which are displayed and the order of their priority, may be determined based on the rank assigned to each of the complex conjunct characters.

As shown in FIG. 8F, when the complex conjunct character "स्ते" (Ste) is selected, the corresponding consonant character may be displayed in the typing area, and the input of word "Namaste" is complete. In an embodiment, the second row of consonant characters may remain unchanged through the input process described in FIGS. 8A-8F. Although the embodiments of the system and method disclosed herein are described with reference to a first row for vowel characters and vowel conjunct characters, a second row for consonant characters, and a third row for consonant conjunct characters, it may be understood that the rows may interchanged, and any layout of the graphical keyboard is possible within the scope of the system and method disclosed herein.

In accordance with the present disclosure, a system for textual input may comprise a server 102 communicatively coupled to a client device 106. The server 102 may comprise one or more processors, for example, processor 202 (FIG. 2). The processor 202 may be operable to extract a plurality of base characters from a dictionary 102a. The processor 202 may be further operable to assign a rank to each conjunct character that corresponds to each of the extracted base characters. The rank may be assigned based on a frequency of occurrence of each conjunct character in the dictionary 102a. The processor 202 may be further operable to sort the conjunct characters based on the assigned rank.

In an embodiment, the processor 202 may be operable to assign a rank to each complex conjunct character among a plurality of complex conjunct characters that correspond to each of the conjunct characters. The rank may be assigned based on a frequency of occurrence of each complex conjunct character in the dictionary 102a.

In accordance with the present disclosure, a system for textual input may comprise a client device 106, communicatively coupled to a server 102. The client device 106 may comprise one or more processors, for example, processor 302 (FIG. 3). The processor 302 may be operable to determine a base character in response to a user input. The processor 302 may be further operable to display one or more conjunct characters that correspond to the base character. The processor 302 may display the one or more conjunct characters based on determining whether a frequency of occurrence of the one or more conjunct characters in the dictionary 102a, is above a predefined threshold.

In an embodiment, the processor 302 may be operable to display the one or more conjunct characters in an order of priority based on the frequency of occurrence of the one or more conjunct characters in the dictionary 102a.

In an embodiment, in response to a selection of one of the conjunct characters displayed, the processor 302 may be operable to display one or more complex conjunct characters that correspond to the selected conjunct character. The processor 302 may display the one or more complex conjunct characters based on a frequency of occurrence of the one or more complex conjunct characters in the dictionary 102a.

Various embodiments of the disclosure may provide a non-transitory computer readable medium, and/or storage medium, and/or a non-transitory machine-readable medium and/or storage medium. Having applicable mediums stored thereon, a machine code and/or a computer program having at least one code section executable by a machine and/or a computer, may thereby cause the machine and/or computer to perform the steps comprising textual input processing. A plurality of base characters may be extracted from a dictionary 102a. A rank may be assigned to each conjunct character among a plurality of conjunct characters that correspond to each of the extracted base characters. The rank may be assigned based on a frequency of occurrence of each conjunct character in the dictionary 102a. The conjunct characters may be sorted based on the assigned rank.

Various embodiments of the disclosure may provide a non-transitory computer readable medium, and/or storage medium, and/or a non-transitory machine-readable medium and/or storage medium. Having applicable mediums stored thereon, a machine code and/or a computer program having at least one code section executable by a machine and/or a computer, may thereby cause the machine and/or computer to perform the steps comprising textual input processing. A base character may be determined in response to a user input. One or more conjunct characters that correspond to the base character may be displayed. The one or more conjunct characters may be displayed based on determining whether a frequency of occurrence of the one or more conjunct characters in the dictionary 102a is above a predefined threshold.

Accordingly, the present disclosure may be realized in hardware, or a combination of hardware and software. The present disclosure may be realized in a centralized fashion, in at least one computer system, or in a distributed fashion, where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:
1. A system for textual input, comprising:
at least one processor configured to:
extract a plurality of base characters of a language of interest of a user;
compile a dictionary for said language of interest;
compare each of a plurality of characters in said dictionary with each of said extracted plurality of base characters to determine a plurality of conjunct characters in said dictionary, wherein said plurality of conjunct characters corresponds to said each of said extracted plurality of base characters;
assign a first rank to each conjunct character among said plurality of conjunct characters based on a first frequency of occurrence of said each conjunct character in said dictionary; and
sort said plurality of conjunct characters based on said assigned first rank.

2. The system of claim 1,
wherein said at least one processor is further configured to assign a second rank to each complex conjunct character among a plurality of complex conjunct characters based on a second frequency of occurrence of said each complex conjunct character in said dictionary,
wherein said each complex conjunct character corresponds to at least one of said plurality of conjunct characters.

3. The system of claim 2, wherein each of said plurality of base characters is a single code point of a character encoding method, each of said plurality of conjunct characters is a combination of two code points of said character encoding method, and each of said plurality of complex conjunct characters is a combination of at least three code points of said character encoding method.

4. The system of claim 3, wherein said character encoding method is one of: Unicode, American standard code for information interchange (ASCII), or Indian standard code for information interchange.

5. A system for textual input, comprising:
in a device with a touch screen interface, at least one processor in said device configured to:
determine a base character based on a user input;
determine a plurality of conjunct characters, in a dictionary, based on a comparison of each of a plurality of characters in said dictionary with said base character; and
display at least one conjunct character of said plurality of conjunct characters based on whether a first frequency of occurrence of said at least one conjunct character in said dictionary is above a threshold.

6. The system of claim 5,
wherein said at least one processor is further configured to display said plurality of conjunct characters in an order of priority,
wherein said order of priority is based on said first frequency of occurrence of said each of said plurality of conjunct characters in said dictionary.

7. The system of claim 5, wherein said at least one processor is further configured to display a plurality of complex conjunct characters, corresponding to said at least one conjunct character, based on a second frequency of occurrence of each of said plurality of complex conjunct characters in said dictionary.

8. The system of claim 5, wherein said at least one processor is further configured to display said plurality of conjunct characters, corresponding to said base character, based on a usage frequency of each of said plurality of conjunct characters.

9. The system of claim 5, wherein said at least one processor is further configured to display vowel characters in a first row and a plurality of consonant characters in a second row.

10. The system of claim 9, wherein said at least one processor is further configured to:
display at least one vowel conjunct character, corresponding to at least one consonant character selected from said plurality of consonant characters, in said first row; and
display at least one consonant conjunct character in a third row based on whether a third frequency of occurrence of said at least one consonant conjunct character in said dictionary is above said threshold.

11. The system of claim 10, wherein said at least one processor is further configured to display at least one complex conjunct character, corresponding to said at least one consonant conjunct character, in one of said first row or said third row based on a fourth frequency of occurrence of said at least one complex conjunct character.

12. A system for textual input, comprising:
at least one processor configured to:
determine a base character based on a user input;
determine a subset of conjunct characters based on a comparison of each of a plurality of characters in a dictionary with said base character; and
display said subset of conjunct characters based on a first rank assigned to each of said subset of conjunct characters.

13. The system of claim 12, wherein said at least one processor is further configured to display a subset of complex conjunct characters, corresponding to one conjunct character selected from said subset of conjunct characters, based on a second rank assigned to each of said subset of complex conjunct characters.

14. The system of claim 12,
wherein said at least one processor is further configured to display said subset of conjunct characters in an order of priority,
wherein said order of priority is based on said first rank assigned to said each of said subset of conjunct characters.

15. A method for textual input, comprising:
in a device with a touch screen interface:
determining a base character based on a user input;
determining a plurality of conjunct characters in a dictionary by comparing each of a plurality of characters in said dictionary with said base character; and
displaying at least one conjunct character of said plurality of conjunct characters based on whether a first frequency of occurrence of said at least one conjunct character in said dictionary is above a threshold.

16. The method of claim 15, further comprising displaying said plurality of conjunct characters in an order of priority,
wherein said order of priority is based on said first frequency of occurrence of each of said plurality of conjunct characters.

17. The method of claim 15, further comprising displaying a plurality of complex conjunct characters, corresponding to said at least one conjunct character, based on a second frequency of occurrence of each of said plurality of complex conjunct characters in said dictionary.

18. The method of claim 15, further comprising displaying vowel characters in a first row and a plurality of consonant characters in a second row.

19. The method of claim 18, further comprising:
displaying at least one vowel conjunct character, corresponding to at least one consonant character selected from said plurality of consonant characters, in said first row; and
displaying at least one consonant conjunct character in a third row based on whether a third frequency of occurrence of said at least one consonant conjunct character in said dictionary is above said threshold.

20. The method of claim 19, further comprising displaying at least one complex conjunct character, corresponding to said at least one consonant conjunct character, in one of said first row or said third row based on a fourth frequency of occurrence of said at least one complex conjunct character.

* * * * *